(12) United States Patent
Gassmann

(10) Patent No.: US 7,346,275 B2
(45) Date of Patent: Mar. 18, 2008

(54) CAMERA, PROCESS FOR RECONSTRUCTING AN IMAGE INFORMATION, AND PROCESS FOR CALIBRATING AN IMAGE INFORMATION

(76) Inventor: Franz Josef Gassmann, Engelbertstrasse 18b, D-45663 Recklinghausen (DE)

( * ) Notice: Subject to any disclaimer, the term of this patent is extended or adjusted under 35 U.S.C. 154(b) by 0 days.

(21) Appl. No.: 10/080,806

(22) Filed: Feb. 21, 2002

(65) Prior Publication Data
US 2002/0131783 A1 Sep. 19, 2002

(30) Foreign Application Priority Data
Feb. 21, 2001 (DE) .............................. 101 08 277

(51) Int. Cl.
*G03B 15/03* (2006.01)
*G03B 7/00* (2006.01)
*G03B 17/24* (2006.01)

(52) U.S. Cl. .................. 396/182; 396/210; 396/225; 396/315

(58) Field of Classification Search .............. 396/210, 396/310, 311, 315, 225
See application file for complete search history.

(56) References Cited

U.S. PATENT DOCUMENTS

| 4,211,558 | A | * | 7/1980 | Oguchi et al. .............. 430/359 |
| 4,237,475 | A | | 12/1980 | Sekiguchi |
| 4,344,683 | A | * | 8/1982 | Stemme ...................... 396/317 |
| 4,365,882 | A | * | 12/1982 | Disbrow ...................... 396/315 |
| 4,511,229 | A | * | 4/1985 | Schwartz et al. ........... 396/225 |
| 4,977,521 | A | * | 12/1990 | Kaplan ........................ 382/254 |
| 5,260,739 | A | | 11/1993 | Nagata |
| 5,617,139 | A | | 4/1997 | Okino |
| 5,634,156 | A | * | 5/1997 | Teremy et al. .............. 396/315 |
| 5,734,941 | A | * | 3/1998 | Teremy et al. .............. 396/315 |
| 5,859,933 | A | | 1/1999 | Sasanuma et al. |
| 6,091,445 | A | | 7/2000 | Matsui et al. |
| 6,459,449 | B1 | | 10/2002 | Juen |

FOREIGN PATENT DOCUMENTS

| DE | 2813262 | 10/1978 |
| DE | 4305883 | 9/1994 |
| GB | 1358079 | 6/1974 |
| JP | 8-237673 | 9/1996 |
| JP | 9-130827 | 5/1997 |
| WO | 99/67738 | 12/1999 |

OTHER PUBLICATIONS

Patent Abstracts of Japan Pub. No. 2001-01667, Jan. 19, 2001 and Japanese Appln. No. 1 118 3702.
Patent Abstracts of Japan BD. 1997, No. 8, Aug. 29, 1997 & JP 9-106002 Apr. 27, 1997.
Patent Abstracts of Japan BD. 1998, No. 12, Oct. 31, 1998 & JP 10-191378 Jul. 21, 1998.

* cited by examiner

*Primary Examiner*—Christopher Mahoney
(74) *Attorney, Agent, or Firm*—Dilworth & Barrese, LLP

(57) ABSTRACT

A camera is provided with media for creating a light signal with at least one of known spectral intensity distribution, chromaticity coordinates and brightness detectable by recording medium positionable within the camera. Processes for reconstructing and calibrating image information on a recording medium are also provided.

34 Claims, 6 Drawing Sheets

FIG. 1, Continued

1: light-signal-creating-element
2a: recording media: e.g. film
2b: recording media: e.g. electronic device
3: imaging lens / camera lens
4: camera unit
5: image area / maximum
6: imaging lens for the light-signal-creating-element
7: object
8: image of the object

FIG. 2, Continued

1a: recorded/developed signal-point, of the light-signal-creating-element: white
1b: recorded/developed signal-point of the light-signal-creating-element: white, different intensity-values
1c: recorded/developed signal-point of the light-signal-creating-element: white, split in spatial separated RGB-points
2: image area
3: recording media: e.g. film strip

CAMERA, PROCESS FOR RECONSTRUCTING AN IMAGE INFORMATION, AND PROCESS FOR CALIBRATING AN IMAGE INFORMATION

BACKGROUND OF THE INVENTION

The within invention concerns a camera for recording an image information.

Cameras of this type are widely known, for example as photo cameras, movie cameras, or even TV cameras. Cameras of this type customarily contain a recording medium on which the image information is stored in specified manner. In the case of, for example a photo camera containing a color film, the image information, that is, the photographed subject, is stored in specified nature and manner that can depend on the camera itself and also on the recording medium. This stored information is then reproduced in the laboratory, for example on photographic paper. In the case of color films, the image information is customarily subdivided into several partial spectral ranges, that is, for example, into red, green, and blue ranges. This spectral distribution can be achieved by photographing with color filters, or, as is customary today, with films having three superimposed layers, each sensitive to one-third of the visual spectrum.

In the case of black-and-white photography, there is no such spectral distribution of the image information to partial ranges. However, here the image information is stored on the recording medium in the form of brightness graduations, that is, in the form of levels of intensity.

In the recording of colored image information, the problem is that the spectral ranges of the recording medium must be developed or reproduced in such manner that the natural coloring of the recorded image information is reproduced. In the reproduction of the image information, care must therefore be taken to ensure that the image is not blue-, green-, or red-tinted, something that could occur if in the development of the film the corresponding spectral ranges of the recording medium were insufficiently exposed. In a color film this defect can be caused by, for example, the fact that the color layer sensitive to the blue spectral range is old and has correspondingly less sensitivity. In development of a film of this type by means of a standard development process, this leads to a situation in which the blue segment of the recorded image is too limited in the reproduction, which means that the reproduced image is green- or red-tinted.

The said effect can also occur when, for example, in a digital camera the components sensitive to different spectral ranges are exposed to different temperatures and thus react with different sensitivities. If an image recorded with a camera of such type is reconstructed, the problem described above occurs again, namely, the color weight does not accord with that of the subject originally photographed.

With black-and-white films the problem is that the brightness of the reproduction does not accord with the brightness of the subject photographed, that is, the luminance of the reproduced image is too high or too low, so the image is too bright or too dark.

SUMMARY OF THE INVENTION

The task of the within invention is to create a camera for recording an image information by means of which the color or brightness information of the subject photographed can be reproduced reliably, independent of the individual lighting situation.

This task is performed by a camera for recording an image information in such manner that the camera has one or more media for creating a light signal with known spectral intensity distribution and/or chromaticity coordinates and/or brightness, which can be recorded by a recording medium that is or can be positioned in the camera. In the case of a color film, for example, the said media generate a light signal with known spectral intensity distribution or with known chromaticity coordinates, which said light signal is recorded on the recording medium in the camera. The recording creates a reference signal whose spectral intensity distribution and/or chromaticity coordinates and/or brightness is/are known and by means of which the recording is calibrated. In this way a reproduction true to the original, or development of the film, is possible.

The term camera refers in principle to all devices with which any desired image can be recorded. The decisive factor for the light signal is that it be recordable in some manner by the recording medium, that is, that the light signal must lie within the sensitivity range of the recording medium. It can but does not have to lie in the visual range. Even short-wave light, for example UV light, can be used. The light signal can for example have wavelengths in the visual range or in the shorter wavelengths range.

Each color in the visual range can be clearly defined through chromaticity coordinates. The chromaticity coordinates are weighted color chromaticities by means of which, via chromatic balancing, based on the known primary valences red (700 nm), green (546.1 nm), and blue (435.8 nm), any selected color vector, that is, any color valence, can be represented. Every color is precisely defined by indication of its chromaticity coordinates. This applies not only to the bright colors but also to the color white, in which all chromaticity coordinates are of equal magnitude. The light signal can also be known by its spectral intensity distribution. This includes the intensity of the light signal, dependent on the wavelengths. The absolute levels of intensity can but do not have to be known. It is sufficient to know the magnitudes of the intensities relative to one another, depending on the wavelengths.

According to the invention, it is equally possible for the color signal to be known in addition to or as an alternative to the chromaticity coordinates or its spectral intensity distribution in its luminance/brightness, that is, in its intensity. In this way brightness calibration is possible for example in color films and in black-and-white films.

BRIEF DESCRIPTION OF THE DRAWINGS

The present invention will now be explained in further detail with reference to the accompanying drawings, in which

In FIG. 1, reference numeral 3 denotes an imaging lens/camera lens, reference numeral 4 denotes a camera unit, reference numeral 5 denotes an image area/maximum, reference numeral 6 denotes an imaging lens for the lightsignal-creating-element 1, reference numeral 7 denotes an object and reference numeral 8 denotes an image of the object. In FIG. 2, reference numeral 2 denotes an image area, with reference numerals 1a-1c respectfully denoting recorded/developed signal points for white light, white light having different intensity values and white light split in spatial separated RGB points.

DESCRIPTION OF THE PREFERRED EMBODIMENTS

Figure 1A:
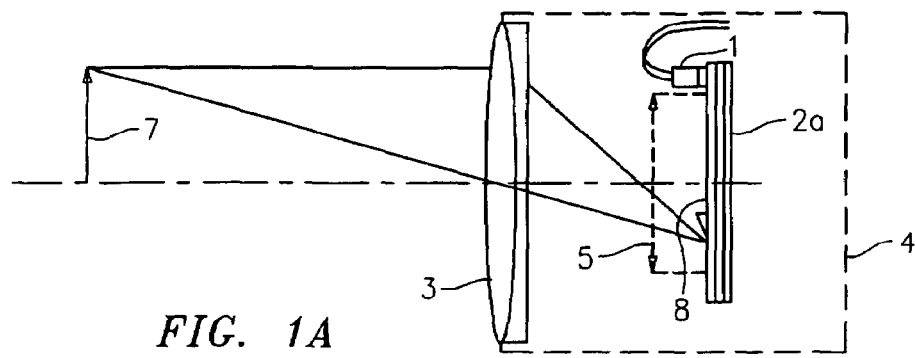
FIG. 1 illustrates a camera 4 having as recording medium, a film 2a shown in FIGS. 1A, 1B and 1D or an electronic device 2b shown in FIG. 1C, and with the element 1 for creating a light signal illustrated in different positions in FIGS. 1A-1D.
Figure 1B:
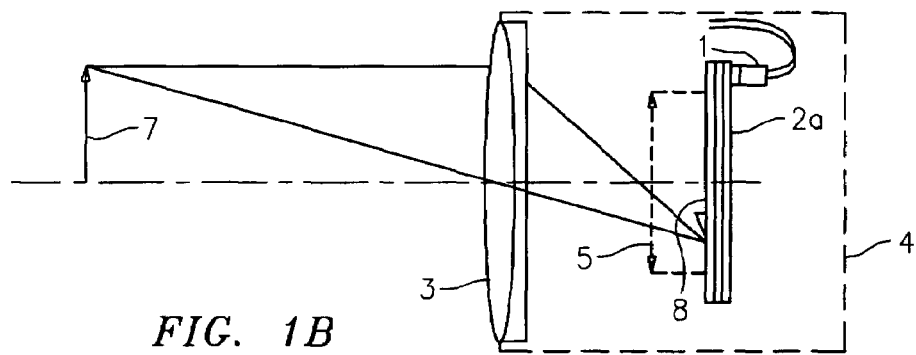
Figure 1C:
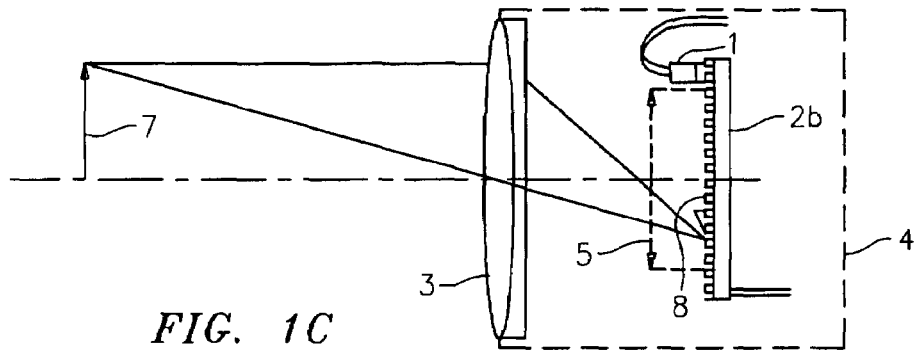
Figure 1D:
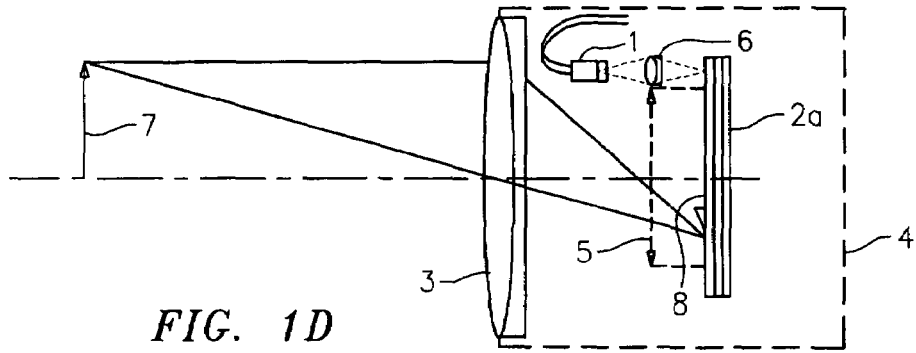
Figure 2A:
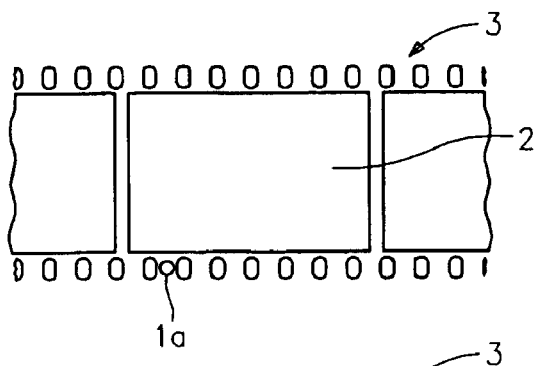
FIG. 2 illustrates a film 3 strip having recording media for the recorded/developed signal point 1a-c created by the element 1, with different types 1a-1c and positions of the signal illustrated in FIGS. 2A-2E.
Figure 2B:
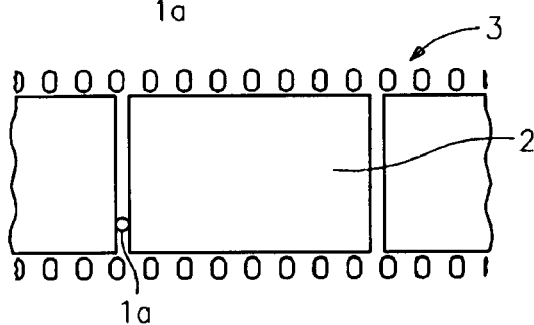
Figure 2C:
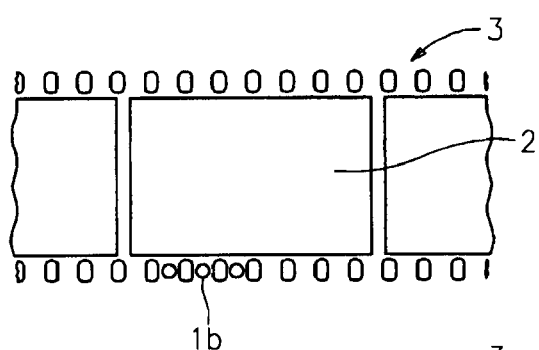
Figure 2D:
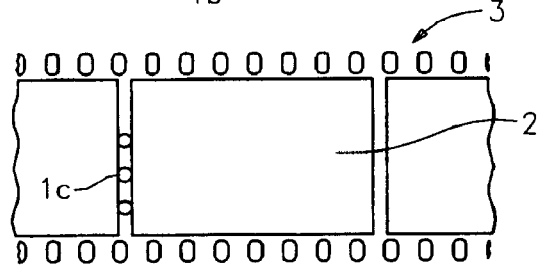
Figure 2E:
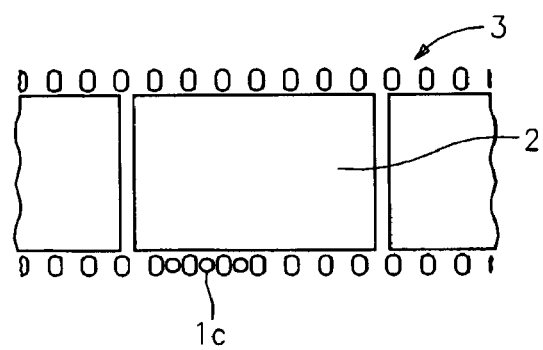
Figure 3:
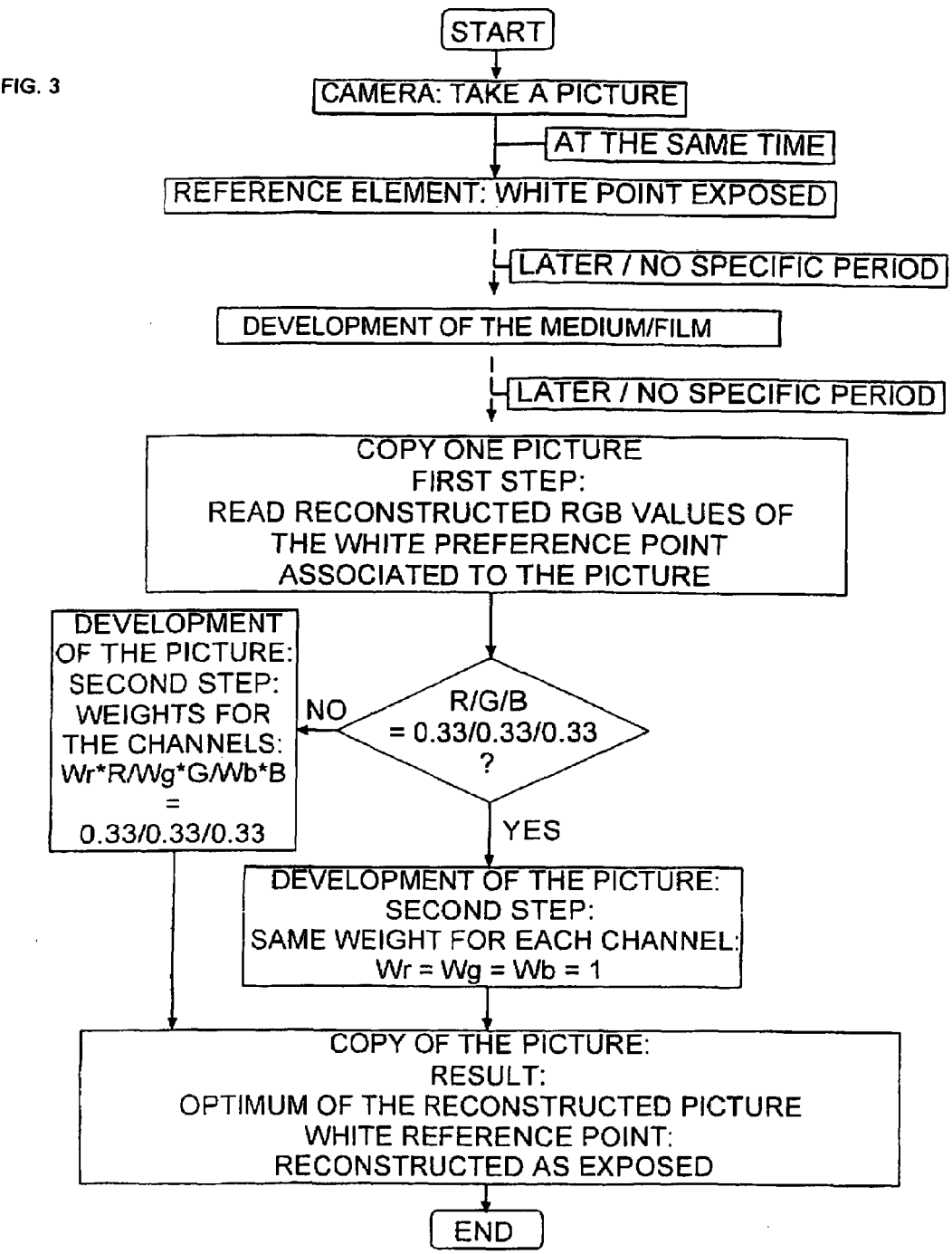
FIGS. 3 and 4 schematically illustrate flow charts of the processes of the present invention.
Figure 4:
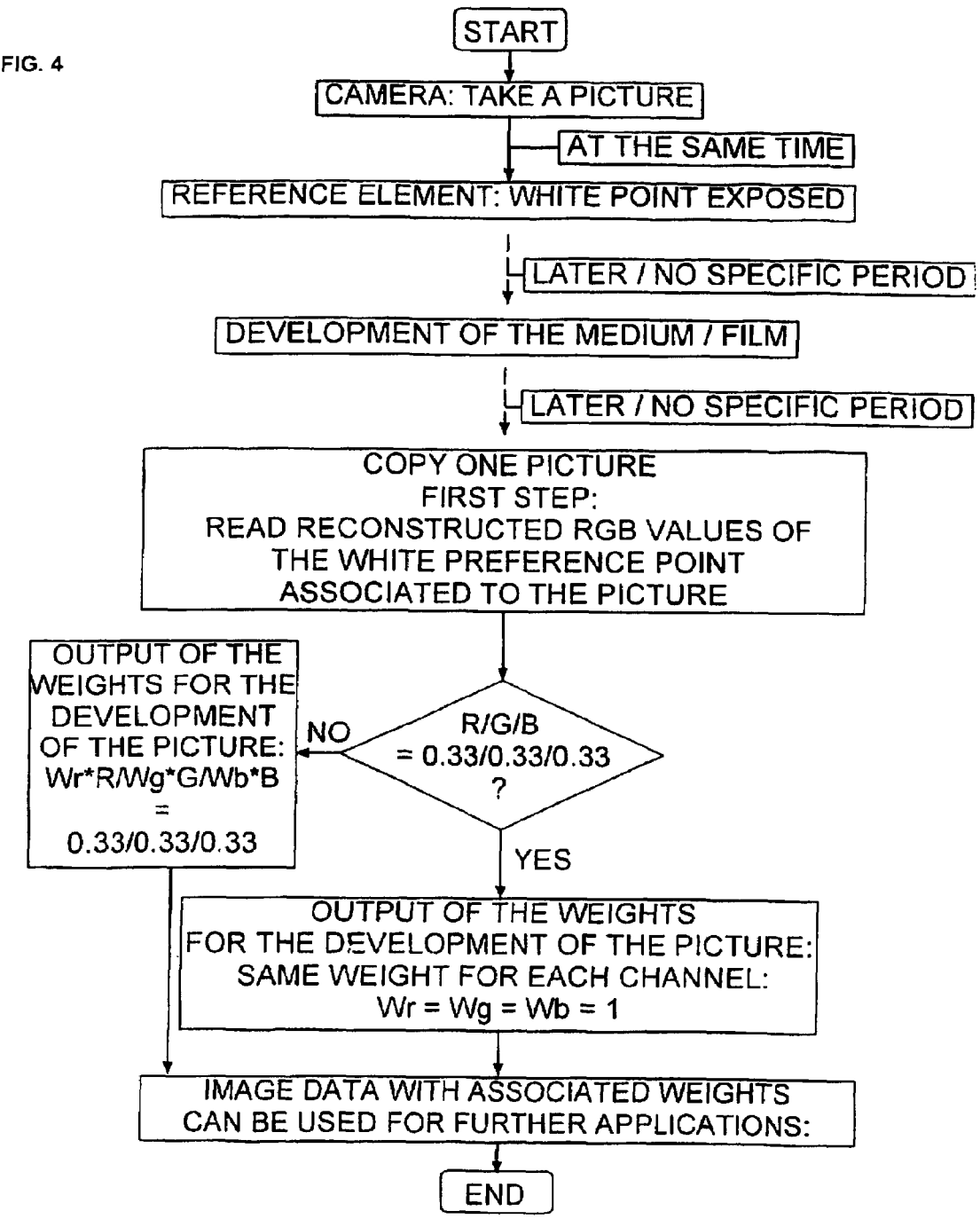

According to a preferred embodiment of the within invention, the light signal consists of white light. White light has the color coordinates x=y=z=0.33. For the creation of such a light signal, the light-signal-creating media can have, for example, a glow lamp. According to the invention, in a photograph a white light spot is created and is recorded on the recording medium in any desired position. This white light spot serves as a reference when the image is reproduced in the laboratory. Here the developer will expose the corresponding spectral range of a film only until the point is again appropriately white on the reproduced image, that is, has the known spectral intensity distribution at least in the above-indicated chromaticity coordinates. This ensures appropriately adjusted development even in the case of a spectral color-film layer with limited sensitivity, so that this spectral chromaticity range is exposed longer, for example in the case of limited sensitivity.

Another embodiment of the within invention provides the capability of creating, via the light-signal-creation media, several individual light signals, with their known respective chromaticity coordinates, which can be recorded by the recording medium.

The light signals can be spatially and/or spectrally separate. The light signal can be spatially separate and can be created by, for example, three light-emitting diodes, e.g. a red, a green, and a blue. It is equally possible to combine three light-emitting diodes which emit a red light, a green light, and a blue light into a single component. This generally leads to a colored or even white beam impact point that nevertheless combines three individual spectral signals. Components of this type, e.g. a "white" LED, are very suitable for the camera according to the invention.

A red, a green, and a blue light signal can for example be created via the light-signal-creating media. In this case each spectral range of, for example, a three-layer color film is acted upon by a light signal with known chromaticity coordinates, so that here again appropriate precise development is possible.

The light signals can be executed in such manner that the red, the green, and the blue light signals together produce white light.

If the light signal created in the camera consists of white light, the advantage is that even differing lighting situations can be reproduced with appropriate accuracy in the image if the light signal is properly reproduced.

Another preferred embodiment of the within invention provides for creation via the light-signal-creating media of a light signal complementary to red, a light signal complementary to green, and a light signal complementary to blue.

Via the light-signal-creating media, light signals can be created that in their central wavelength lie respectively between the spectral primary sensitivities of the recording medium. For instance, if the central wavelengths of the recording medium lie for example in the blue-green-red range, provision can be made for the created light signals to have central wavelengths between the blue/green ranges and between the green/red ranges. If for instance a spectrally broad light signal, that is, a light signal with broad wavelength distribution between blue and green and between green and red is used, the respective segments are recorded in the blue, green, and red sensitivity range of the recording medium, if these sensitivities and the input signal have corresponding widths, so that intersection is possible. In this way a calibration of the spectral transfer function of the recording medium can be achieved with two spectrally broad light signals.

According to a preferred embodiment of the within invention, the camera is an analog or digital photo camera, an analog or digital movie camera, or a TV camera. Analog photo cameras include for example, both the common photo cameras and instantaneous cameras. Digital photo cameras include, for example, CCD cameras and CMOS cameras.

In principle, however, the within invention is not limited to the said cameras, it refers to all devices with which any selected image information can be recorded.

The light-signal-creating media can be executed in such manner that the light signal is characterized by its brightness. Such an embodiment is significant for, e.g., black-and-white films. Here there is no spectral distribution of the image information in the camera or in the recording medium. In black-and-white films an exact reproduction can be created if the brightness, that is, the luminance, is known. According to the invention, for this purpose a light signal of known luminance is generated via the light-signal-creating media and is recorded on the recording medium. This can be, for example, a white or also colored light spot of known intensity. The developer can control the development process in such manner that in the image reproduction the light spot appears in exactly this brightness, that is, luminance. Such brightness calibration is conceivable and significant not only in black-and-white films but also in color films.

It is particularly advantageous if the light-signal-creating media are executed in such manner that two or more separate light signals of differing brightness can be created. If only one light signal of known luminance is created, the developer can ensure that ranges of this brightness are reproduced true to the original. However, in this case care must be taken that the relationship between the intensity, that is, the luminance or intensity, and the depth of shade at any rate in partial ranges is not linear. To adjust the nonlinearity of this relationship, according to the invention it can be made possible to create two or more, for example three, separate light signals of differing brightness so that a color depth curve can be created that precisely reproduces the relationship between shade depth and intensity of radiance. This ensures that in a black-and-white film, for example, the optical density accords over a broad intensity range with the conditions of the subject photographed.

For a non-linear course of the exposure curve, at least three points are needed on the exposure curve, through which the corresponding straight lines are then traced. In this way the non-linear course of the dependence of the exposure energy on the optical density is effectively reproduced. However, if a linear approach to the exposure curve is sufficient, only two points, that is, two light signals of differing intensity, are needed. If it is desired to record non-linearities as well, at least three test points, that is, two light signals of differing intensity, are needed for an approximation.

The characterizing of the light signal by its brightness can of course be used not only for black-and-white films but also for color films, since even for light signals characterized by chromaticity coordinates there are many different optional brightnesses, so that even in color films the luminance can be an alternative parameter or a parameter to be recorded in addition to the chromaticity coordinates. This also applies to light signals whose spectral intensity distribution is known. Regardless of whether these light signals lie in the visual UV or IR range, here too an additional or alternative characterization according to intensity is possible.

It is particularly advantageous if the light signals include white light of varying brightness.

Another embodiment of the within invention provides for the camera or the recording medium to be executed in such manner that the image information is recorded in several spectral ranges. Such a spectral breakdown of the image information is customary with, e.g., color films. For example, it is possible to provide three spectral channels, one of which records the red segment, one records the green segment, and one records the blue segment of the subject photographed. In order to obtain a white light signal, for instance, the wavelengths of the individual colors as well as the ratio of their intensities to one another must be properly coordinated. If not only the ratio of the intensities but also the absolute values of the individual intensities of the red, green, and blue lights are known, not only a white light signal but also a white light signal with the original brightness of the light signal created in the camera and recorded on the recording medium is obtained.

In another embodiment of the within invention, provision is made for recording of the image information in the three spectral ranges of red, green, and blue, or ranges complementary thereto, or between the blue/green and green/red ranges or ranges complementary thereto, and the light-signal-creating media are executed in such manner that the light signal can be recorded in each of these spectral ranges.

Here the light signal could for example be a white light spot composed of appropriate red, green, and blue segments. This ensures that each of the spectral ranges of the recording medium is calibrated.

In one preferred embodiment of the invention, the image information can be recorded as a black-and-white image, and at least two white light signals of differing brightness can be created via the light-signal-creating media. If it is desired to take the non-linearity of the dependence of the optical density on the intensity, that is, the luminance, into account, at least three white light signals of differing brightness must be created. Through the embodiment according to the invention, especially if there are more than two white light signals, a particularly precise optical density curve is recorded, which permits the particularly precise reproduction of the brightness of the photographed subject.

The light-signal-creating media can include light-emitting diodes, glow lamps, laser diodes, fluorescence diodes, luminescence diodes, glow lamps, or other lighting media.

In another embodiment of the invention, the light-signal-creating media have one or more color and/or intensity filters positioned between the lighting medium and the recording medium. In this way it is possible, for example, to fade specific spectral ranges out of the white light of the incandescent lamp and to use only these ranges for calibration. Similarly, it would be possible to break up the white light of the incandescent lamp into three spectral ranges, and here appropriately to create the different light signals that can be recorded by the recording medium.

The within invention further concerns a process for reconstructing an image information recorded on a recording medium, in which the image reconstruction is controlled in such manner that the spectral intensity distribution and/or the chromaticity coordinates and/or the brightness of a light signal information recorded on the recording medium accords with the light signal generated by the light-signal-creating media or with that of the light signal complementary thereto, or the divergence between the reconstructed and the created light signal lies within a tolerance range or is minimized.

A color film or even a black-and-white film, for example, can serve as the recording medium. Other desired recording media can also be used.

The within invention also concerns a process for calibrating an image information recorded on a recording medium, in which the divergence of the reconstructed light signal from the light signal generated by the light-signal-creating media or the light signal complementary thereto is recorded parametrically and these parameters are supplied as calibration parameters for further image reconstruction or image processing.

Conceivably, for example, films, e.g. color films, would be developed in the laboratory as usual in order not to change or increase the cost of the process. The customer could then be given the calibration parameters after development.

It is particularly advantageous if the calibration parameters are used in the image reconstruction to minimize the divergence of the reconstructed light signal from the light signal created in the camera or the light signal complementary thereto. The customer can now for example scan his slides or negatives at home and input the calibration parameters into an appropriate software program. The software program makes the appropriate adjustment, providing the customer with an optimized result.

The process according to the invention makes it possible for the developer to create a particularly accurate reproduction of the color print or the brightness of the photographed object when the film is developed. The film itself can for example be developed as usual on photographic paper, or can also include a computer-supported image development.

The light signal used in the process according to the invention, the recording medium, and the camera are embodied preferably according to disclosure herein.

Additional details and advantages of the within invention are explained in greater detail by means of one example of an embodiment.

The camera is a photo camera or a simple CCD camera with a black-and-white film. The camera has one spectral sensitivity range, but records in it only intensities (bright/dark), that is, the sensitivity range is not subdivided into individual ranges as is the case in, for example, color cameras.

The camera contains a white-light-creating incandescent lamp. Before each photograph, or only once at the start of a film, an appropriate white light signal is generated and is recorded on the black-and-white film. The luminance/brightness, that is, the intensity, of the light signal is known.

The film is reproduced, i.e. developed, until the generated light signal recorded on the recording medium shows the known brightness. At least in this intensity range an image reproduction true to the original, at least in this intensity range, is thereby ensured.

Another embodiment concerns a photo camera with a color film, or a color CCD camera. A camera of this type has a spectral sensitivity range that is subdivided into several partial spectral ranges. These partial ranges are subdivided into a red segment, a green segment, and a blue segment of the recorded image information.

The camera has a incandescent lamp that does or does not emit white light with known intensity distribution. Alternatively, three light-emitting diodes can also be provided, emitting light in the red, green, and blue ranges, respectively.

In developing a film of this type, by means of appropriate exposure the ratio of the chromaticity coordinates to one another can be guaranteed to remain unchanged, that is, in the reproduction the ratio of the red, green, and blue segments is selected in such manner that a white light signal is again created. When three separate light-emitting diodes are used, development is done in such a way that the appropriately created color points reappear in appropriate colors and in a ratio appropriate to their intensities, that is, with constant pre-known chromaticity coordinates. This ensures that in the image reconstruction the color impression of the photographed starting situation, that is, the image recorded, is preserved.

According to another embodiment, the above-mentioned color-film camera has media for creating a light signal for which not only the chromaticity coordinates but also the luminance are known. This makes it possible to recreate not only the chromaticity coordinates of the light signal or signals, but also to ensure during development that the brightness of the corresponding signals is again preserved. When the image is reconstructed, the brightness impression of the photographed scene is thereby obtained in realistic condition. According to the invention, exact reproduction of the color and/or brightness impression of the photographed scene is thus possible.

Starting with the camera-generated signal, it is thus possible to influence the image reconstruction process in such manner that the color and/or intensity impression of the recorded image situation is preserved. The image can be processed for example by photochemical means (creation of prints on photographic paper) or also by computer image processing.

If in the recording of the image the transfer of the blue segment is relatively poor, for example because the pertinent layer of the color film is old or because a corresponding recipient has too low a temperature, the ratio of the various spectral partial ranges shifts, to the disadvantage of the blue segment, and in standard image reconstruction the color impression shifts into the green and red range, whereupon the image takes on a green or red tint.

According to the invention, in computer image reconstruction, when the recorded calibration signal is known, it is now necessary merely to heighten the blue segment in such manner that the ratio of the individual red, green, and blue spectral color ranges in the reconstructed image ultimately created accords with that of the light signal generated. This means that an adjustment is made to maintain the reciprocal ratio of the individual spectral ranges, i.e. the chromaticity coordinates. This procedure maintains the color impression.

If in addition to this ratio the absolute level of the intensities, that is, the luminances, is adjusted to the camera-generated signal, the image is optimized to the brightness impression.

In the photochemical development process, a weak transfer of the blue segment is compensated for by raising this spectral range, e.g. through increased exposure of the photographic paper in this range; that is, "blue" is exposed for a longer time, or is processed with a higher intensity. The same applies to the complementary color of the pertinent spectral range, depending on whether a "negative or positive process" for the production of positives or negatives is involved. Here too, the color and/or brightness impression can be adjusted.

Examples of light-signal-creating media that can be used include incandescent lamps or light-emitting diodes can be used. A signal surface can also be mapped on or in the camera.

To adjust the non-linear transfer of intensities, white points of various intensities can be created, by means of which appropriate optical density curves can be recorded in black-and-white films.

An example of a light-signal-creating medium can be a white-light LED consisting of three individual spectral intensities. The LED can be positioned directly before the film plane of a film camera. If in the image reconstruction the brightness of the reconstructed white point as well as the chromaticity is adjusted accordingly, the brightness impression is thus preserved in the image reconstruction.

The within invention makes it possible, by means of the invention media for creating a light signal with known spectral intensity distribution and/or known chromaticity coordinates and/or known luminance, to achieve an image reconstruction that is accurate as regards color impression and/or brightness. The light-signal-creating media can be positioned in or on the camera. Preferably it is directly above the plane of the film.

The within invention makes it possible to create and record a defined calibration light signal, the measurement of the spectral transfer function, that is, the question of how for instance the individual color segments are transferred, as well as compensation of the spectral transfer function when the image is reconstructed, e.g., production of paper prints or adjustment of the color data when data are transferred to a video beamer or a monitor or a color printer.

The invention claimed is:

1. Recording device for recording an image information, characterized by the fact that the recording device comprises one or more media for creating one or more reference signal white light spots, said light spots being independent of the illumination conditions of an object from which the image is taken and have known spectral intensity distribution and/or chromaticity coordinates and/or brightness, said one or more media for creating one or more reference signal white light spots is positioned in said recording device and said reference signal white light spots are recorded at the same time as a picture is taken.

2. Recording device according to claim 1, characterized by the fact that the light spots have wavelengths in the visual range or in the range of shorter wavelengths.

3. Recording device according to claim 1, characterized by the fact that the light spots consists of white light.

4. Recording device according to claim 1, characterized by the fact that by means of light-signal-creating media, several separate light signals with respective known chromaticity coordinates that can be recorded by the recording medium can be created.

5. Recording device according to claim 4, characterized by the fact that several spatially and/or spectrally separate light signals can be created.

6. Recording device according to claim 4, characterized by the fact that by means of the light-signal-creating media, a red, a green, and a blue light signal can be created.

7. Recording device according to claim 6, characterized by the fact that the red, the green and the blue light signals together produce white light.

8. Recording device according to claim 4, characterized by the fact that by means of the light-signal-creating media, a light signal complementary to red, a light signal complementary to green and a light signal complementary to blue can be created.

9. Recording device according to claim 4, characterized by the fact that by means of the light-signal-creating media, light signals can be created that in their central wavelength lie respectively between the spectral primary sensitivities of the recording medium/camera.

10. Recording device according to claim 1, characterized by the fact that the device is an analog or digital photo camera, an analog or digital movie camera, or a TV camera.

11. Recording device according to claim 1, characterized by the fact that light-signal-creating media are executed in such a manner that a light signal is characterized by its brightness.

12. Recording device according to claim 11, characterized by the fact that the light-signal-creating media are executed in such manner that two or more separate light signals having different brightness can be created.

13. Recording device according to claim 12, characterized by the fact that the light signals include white light of differing brightness.

14. Recording device according to claim 1, characterized by the fact that the camera or recording medium is executed in such a manner that the image information is recorded in several spectral ranges.

15. Recording device according to claim 14, characterized by the fact that the image formation is recorded in the three spectral ranges of red, green, and blue, or complementary ranges, or between the blue/green and green/red range or ranges complementary thereto, and the light-signal-creating media are executed in such manner that the light signal can be recorded in each of these spectral ranges.

16. Recording device according to claim 1, characterized by the fact that the image information can be recorded as a black-and-white image and by means of the light-signal-creating media at least two white light signals of differing brightness can be created.

17. Recording device according to claim 1, characterized by the fact that the light-signal-creating media include light-emitting diodes, incandescent lamps, laser diodes, flourescent diodes, luminance diodes, glow lamps, or other light media.

18. Recording device according to claim 1, characterized by the fact that light-signal-creating media have one or more chromaticity and/or intensity filters positioned between the lighting medium and the recording medium.

19. Recording device according to claim 1, comprising
a camera (4) with film (2a) or an electronic device (2b) positioned within the camera (4) as recording media,
an imaging or camera lens (3) positioned in front of an opening into the camera (4) and arranged to create an image (8) of an object (7) outside the camera (4) upon the recording media (2a, 2b), and
a light-signal-creating element (1) positioned either in front of or behind the recording media (2a, 2b) within the camera (4).

20. Recording device according to claim 19, wherein the recording medium is film (2a), the light-signal-creating element (1) is positioned in front of the film (2a), and additionally comprising
an imaging lens (6) for the light-signal-creating element (1) and positioned between the same (1) and film (2a).

21. Recording device according to claim 20, wherein the recording media is a film (3) comprising
an image area (2), and
recorded/developed light signal-points of a light-signal-creating element for white light (1a), white light having different intensity values (1b) or white light split in spatial separated RGB-points (1c).

22. Recording device according to claim 19, wherein the recording media is a film (3) comprising
an image area (2), and
recorded/developed light signal-points of a light-signal-creating element for white light (1a), white light having different intensity values (1b) or white light split in spatial separated RGB-points (1c).

23. Recording device according to claim 1, wherein the recording media is a film (3) comprising
an image area (2), and
recorded/developed light signal-points of a light-signal-creating element for white light (1a), white light having different intensity values (1b) or white light split in spatial separated RGB-points (1c).

24. Recording device according to claim 1, wherein the media generate a light signal with known spectral intensity distribution or chromaticity coordinates, this light signal being recorded on the recording medium in the camera and thus creating a reference signal by which the recording is calibrated, such that reproduction true to an original is possible.

25. Recording device according to claim 24, structured and arranged to take into account at least one of (i) layers of color in the recording medium having aged and possessing reduced sensitivity and (ii) compensating for different temperature.

26. Recording device according to claim 25, structured and arranged such that upon development, spectral range of film is exposed until the white light spot is appropriately white upon the recorded image, to thereby reliably reproduce a photographed scene independent of limited or changing sensitivities of film layers and allow a film possessing limited sensitivity to be exposed longer.

27. Recording device according to claim 24, structured and arranged such that upon development, spectral range of film is exposed until the white light spot is appropriately white upon the recorded image, to thereby reliably reproduce a photographed scene independent of limited or changing sensitivities of film layers and allow a film possessing limited sensitivity to be exposed longer.

28. Recording device according to claim 1, structured and arranged to take into account at least one of (i) layers of color in the recording medium having aged and possessing reduced sensitivity and (ii) compensating for different temperature.

29. Recording device according to claim 28, structured and arranged such that upon development, spectral range of film is exposed until the white light spot is appropriately white upon the recorded image, to thereby reliably reproduce a photographed scene independent of limited or changing sensitivities of film layers and allow a film possessing limited sensitivity to be exposed longer.

30. Recording device according to claim 1, structured and arranged such that upon development, spectral range of film is exposed until the white light spot is appropriately white upon the recorded image, to thereby reliably reproduce a photographed scene independent of limited or changing sensitivities of film layers and allow a film possessing limited sensitivity to be exposed longer.

31. Recording device according to claim 1, wherein upon subsequent developing or reproduction, said reference signal is developed upon recording medium until the known luminescence or brightness appears, thereby ensuring image production true to an original.

32. Process for reconstructing an image information recorded on a recording medium, characterized by the fact that the image is reconstructed in such manner that the spectral intensity distribution and/or the chromaticity coordinates and/or brightness of a light signal information recorded on the recording medium and reconstructed correspond to that of one or more white light spots generated by one or more media for generation of said white light spots on the recording medium at the same time as a picture is or to that of a complementary light signal or in such manner that the divergence between the light signal information and the white light spot lies within a tolerance range or is minimized.

33. Process for calibrating an image information recorded on a recording medium, characterized by the fact that the divergence between the reconstructed light signal to one or more white light spots generated by one or more media for generation of said white light spots on the recording medium at the same time as a picture is taken or to a complementary light signal is recorded parametrically and that these parameters are processed as calibration parameters for further image reconstruction and/or image processing.

34. Process according to claim 33, characterized by the fact that the calibration parameters are used to minimize the divergence of the reconstructed light signal from the camera-created light signal or the light signal complementary thereto in the image reconstruction.

* * * * *